Dec. 31, 1968   J. L. BOSSHART   3,418,843
TESTING APPARATUS FOR DUAL HYDRAULIC SYSTEMS
Filed July 18, 1966
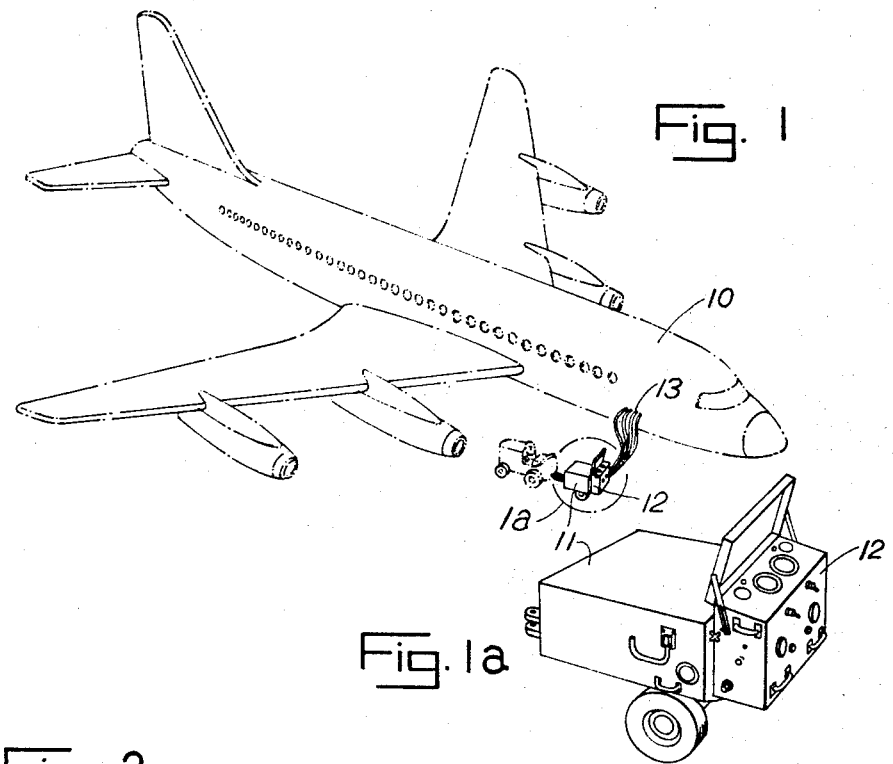
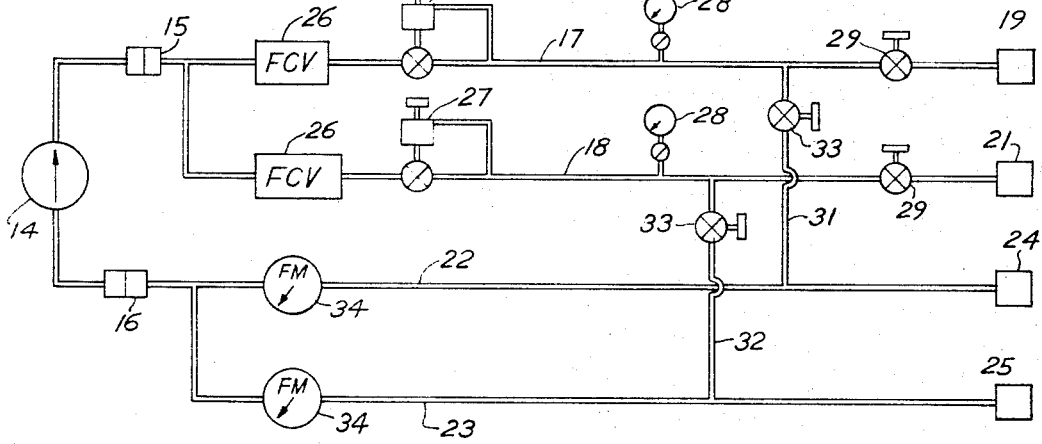
INVENTOR.
JOHN L. BOSSHART
BY
ATTORNEYS

# United States Patent Office 3,418,843
Patented Dec. 31, 1968

3,418,843
TESTING APPARATUS FOR DUAL
HYDRAULIC SYSTEMS
John L. Bosshart, Arlington Heights, Ill., assignor to
Sun Electric Corporation, a corporation of Delaware
Filed July 18, 1966, Ser. No. 566,072
8 Claims. (Cl. 73—37)

ABSTRACT OF THE DISCLOSURE

A testing apparatus for simultaneously testing dual hydraulic systems includes a fluid pressure source connected in parallel to a pair of fluid supply lines and a pair of fluid return lines. Each pair of lines is adapted to be connected to the dual systems to be tested and a flow control valve and pressure regulator is provided in each of the supply lines. A pressure indicator is provided to indicate the pressure in each of the supply lines and a flow rate indicator is provided to indicate the flow rate in each of the return lines.

Background of the invention

This invention relates to testing apparatus for dual hydraulic systems and more particularly to apparatus for simultaneously testing dual hydraulic control systems on aircraft.

It has been conventional for some time to perform various control functions in aircraft hydraulically. Examples of such control functions include the raising and lowering of the landing gear, actuation of the control surfaces, such as rudders, ailerons and the like, nose wheel steering and radar scanning movements.

The hydraulic systems for performing such functions are tested frequently, normally after each trip, to be sure that they are functioning properly to effect the desired control functions properly and at the required rates of speed. This has usually been done with single system test apparatus which consists essentially of a pump which can be connected through couplings to the hydraulic system.

As a safety precaution, it has recently become the practice to install dual hydraulic systems for such control functions or for at least the more critical functions. Such systems involve two complete sets of piping and actuators in parallel with each other and can be selected by the pilot for operation for each function so that in the event of a failure in one system the other can be utilized with no loss of control.

The provision of dual systems substantially doubles the time and work required for testing with conventional single system test apparatus, because each system must be tested separately. This means after testing one system the test apparatus must be disconnected therefrom and reconnected to the other system for repetition of the test thereon.

It is accordingly one of the objects of the present invention to provide testing apparatus for dual hydraulic systems which is capable of testing both systems simultaneously and with a complete and accurate test being performed on each system.

Another object is to provide an accessory device which can be used with a conventional single system test apparatus for simultaneous testing of dual hydraulic systems.

Summary of the invention

According to a feature of the invention the apparatus includes parallel supply and return lines for connection respectively to the hydraulic systems of the aircraft and which are provided with flow control valves and pressure regulators to control the individual flows and pressures therein. Valve control bypasses are provided from the supply to the return lines respectively to enable the desired test conditions to be set up in the apparatus. Preferably flow meters are also provided in the return lines to check and set up for proper flow rates prior to and during testing.

The above and other objects and features of the invention will be more readily apparent from the following description when read in connection with the accompanying drawing in which:

Brief description of the drawings

FIGURE 1 is a more or less diagrammatic view of an aircraft being tested by the apparatus of the invention;

FIGURE 1a is a perspective view of a complete portable test apparatus; and

FIGURE 2 is a diagrammatic view of the hydraulic circuitry of the apparatus.

Description of the preferred embodiment

The apparatus may be applied to any conventional type of aircraft as shown at 10 in FIGURE 1 which is provided with hydraulic systems and preferably with dual hydraulic systems for operation of various control functions on the aircraft. Two aircraft having single hydraulic systems also may be tested simultaneously by the use of the present apparatus. The complete test apparatus, as shown in FIGURE 1, is preferably made up in the form of a cart which can be moved to a position close to the aircraft to be tested and which can be coupled, as described hereinafter, to the various hydraulic control systems of the aircraft in a selective manner for individual testing thereof. As shown in FIGURE 1, the test apparatus includes a power unit or prime mover 11 which contains a motor and a pump driven thereby to supply hydraulic fluid under the desired pressure and flow capacities. The motor may be an electric motor or could be an internal combustion engine depending upon conditions. The power unit 11 could be a conventional single system apparatus or any other source of supply of liquid having adequate flow and pressure capacity.

The test apparatus to which the present invention relates is preferably housed in a separate housing as shown at 12 which is provided with instrument gauges for observing flow and pressure and with control handles for the various valves and flow and pressure controls to be described hereinafter. Hoses 13 extend from the test apparatus for connection to the hydraulic systems which are to be tested.

As seen in FIGURE 2 hydraulic fluid under pressure is supplied by a pump 14 which may be a part of the prime mover 11. It is to be noted, however, that the exact source of test fluid is not critical and that any pump available capable of producing the desired pressure and flow rates could be employed without requiring that a pump be a part of a test apparatus itself.

The outlet of the pump is connected through a coupling 15 to an inlet connection for the test apparatus and the pump inlet or a sump associated therewith is similarly connected through a connection 16 to a return connection for the apparatus.

The test apparatus includes two hydraulic fluid supply lines 17 and 18 connected in parallel to the inlet connection and the coupling 15 and terminating in quick detachable, self-sealing parts 19 and 21 which are adapted for connection to the high pressure side of the dual hydraulic control systems on the aircraft. The return connection is similarly connected to a pair of return lines 22 and 23 which terminate in quick detachable, self-sealing coupling parts 24 and 25 which are adapted for connection to the low pressure return connections of the same dual hydraulic systems on the aircraft. When the connections are so made, the supply line 17 and the return line 22 will be connected in circuit with one of the dual hydraulic systems while the supply line 18 and the return line 23 are connected in circuit with the other of the dual hydraulic systems on the aircraft.

In order to control the rate of flow through the system a flow control valve as shown at 26 is provided in each of the supply lines 17 and 18. These valves are of a known type and are adjustable to limit the maximum rate of flow therethrough at any given pressure. For example, the valve may be of a size and capacity to provide flows up to 25 gallons per minute at 3000 pounds per square inch or up to 12 gallons per minute at 5000 pounds per square inch, which values are commonly used in aircraft hydraulic systems currently, although these values are not critical and could be changed to meet the requirements of different aircraft. Downstream from the flow control valves each supply line is provided with an adjustable pressure regulating valve 27 of the conventional type to control the output pressure in the supply line. The pressure regulating valves are preferably adjustable through a wide range on the order of 100 pounds per square inch to about 5000 pounds per square inch to enable the testing of a wide range of control systems of different types.

The pressure in each of the supply lines is indicated by a pressure gauge 28 connected thereto downstream from the pressure regulator 27. The pressure gauges may be of a conventional type capable of indicating hydraulic pressures between 0 and 5000 pounds per square inch.

Each of the supply lines may further be provided with a shutoff valve 29 therein downstream from the flow control valve, the pressure regulator, and the pressure gauge. As explained hereinafter, the valves 29 may be omitted and their functions performed by the valves in the self-sealing couplings 19, 21, 24, and 25.

A bypass connection 31 is connected between the supply line 17 and the return line 22 and a similar bypass connection 32 is provided between the supply line 18 and the return line 23. Each bypass connection is provided with a shutoff valve 33 by means of which it may be selectively opened or closed.

In addition, each of the return lines hsa a flow meter 34 connected therein to indicate the rate of flow therethrough. The flow meter may be of conventional type capable of indicating flow accurately up to the maximum flow capacity of the system such as, for example, 25 gallons per minute.

To use the test apparatus, the coupling parts 19, 21, 24 and 25 are respectively coupled to the appropriate connections of dual hydraulic control systems on the aircraft. Where necessary, extension hoses may be employed. At this time, the valves 29, when provided, are closed so that the test apparatus is isolated from the hydraulic systems and the bypass valve 33 are opened. With pump operating, the flow control valves 26 are then adjusted to the desired flow capacity, depending upon the systems to be tested, with the actual flow through the closed pipe systems being accurately checked by the flow meters 34. The bypass valves 33 are then closed and the pressure regulators 27 are adjusted to the desired test pressure. This pressure is readily checked on the pressure gauges 28.

With the flow and pressure properly adjusted, the valves 29 are opened so that fluid can flow from the lines 17 and 18 through the hydraulic systems on the aircraft which are to be tested and returned through the lines 22 and 23 to the test pump 14. After completing the test of one complete dual hydraulic system, both parts of which are tested simultaneously, the bypass valves may be opened and the coupling parts 19, 21, 24 and 25 may be disconnected from the aircraft.

Alternatively, when valves 29 are not provided, coupling parts 19, 21, 24 and 25 are not connected to the aircraft systems so that the self-sealing valves therein will close. Bypass valves 33 are opened and the flow control valves 26 are then adjusted to the desired flow capacity depending on the systems to be tested. The actual flows through the closed pipe systems are accurately checked by the flow meters 34. The bypass valves 33 are then closed and the pressure regulators 27 are adjusted to the desired pressures. This pressure is readily checked on the pressure gauges 28. With the bypass valves 33 again opened, the coupling parts 19, 21, 24 and 25 are respectively coupled to the appropriate connections of dual hydraulic control systems on the aircraft and the testing may proceed.

It will be seen that by the use of the present apparatus, each part of a dual hydraulic system is tested independently of the other but simultaneously therewith. In the event of a fault or failure in any one of the systems, the instruments which are connected to that system will give an immediate indication. For example, in the case of leakage in any one of the systems the pressure gauge connected to the supply line which is in turn connected to that system would tend to show a drop in pressure indicating a pressure loss. A loss of rate of response of an actuator as required by the previously set flow rate would be indicated by reduced flow on flow meter 34 and would show a malfunction. Similarly should the system be clogged, this would be indicated by maintenance of the desired pressure as indicated by the pressure gauge but by loss of flow as indicated by the flow meter. It will thus be seen that by the use of this apparatus the dual hydraulic systems on an aircraft can be simultaneously tested with each system receiving a complete and accurate test. It will also be seen that by closing one of the shut-off valves 29 or by disconnecting one set of coupling parts 19 and 21 or 24 and 25, the apparatus can be used for testing a single hydraulic system or even that the different branches of the apparatus could be connected to single systems on different aircrafts for simultaneous testing thereof upon an individual basis.

While the invention has been specifically described for testing hydraulic systems on aircraft, it will be apparent that it could be used equally well for testing any other type of hydraulic system. Also, while one embodiment of the invention has been shown and described in detail, it will be understood that this is for the purpose of illustration only and is not to be taken as a definition of the scope of the invention, reference being had for this purpose to the appended claims.

What I claim is:

1. Testing apparatus for dual hydraulic systems comprising:
    an inlet connection for hydraulic fluid under pressure,
    a return connection,
    a pair of fluid supply lines connected in parallel to the inlet connection and adapted to be connected respectively to the hydraulic systems,
    a pair of fluid return lines connected in parallel to the return connection and adapted to be connected respectively to the hydraulic systems,
    a flow control valve in each of the supply lines to limit the flow of fluid therethrough,
    a pressure regulator in each of the supply lines to control the pressure therein, and
    indicating means for indicating selected fluid characteristics in at least one pair of said pair of supply and return lines.

2. The testing apparatus of claim 1 further including a shut-off valve in each of the supply lines downstream from the flow control valve and pressure regulator therein.

3. The testing apparatus of claim 1 further including a bypass connection from each of the supply lines to one of the return lines and a shut-off valve in each of the bypass connections.

4. The testing apparatus of claim 3 further including a shut-off valve in each of the supply lines downstream from the flow control valve, the pressure regulator and the bypass connection therein.

5. The testing apparatus of claim 1 further including a flow meter in each of the return lines and a pressure gauge in each of the supply lines downtsream from the flow control valve and pressure regulator therein.

6. The testing apparatus of claim 1 wherein said indicating means includes an indicator for indicating the pressure of the fluid in each of said pair of supply lines.

7. The testing apparatus of claim 1 wherein said indicating means includes an indicator for indicating the flow rate of the fluid in each of said pair of return lines.

8. The testing apparatus of claim 7 wherein said indicating means also includes an indicator for indicating the pressure of the fluid in each of said pair of supply lines.

References Cited

UNITED STATES PATENTS

| | | | |
|---|---|---|---|
| 2,310,974 | 2/1943 | Lumm | 73—4 |
| 2,866,365 | 12/1958 | Worthen | 73—37.5 |
| 3,077,102 | 2/1963 | Greer et al. | 73—4 |
| 3,089,331 | 5/1963 | Sharko et al. | 73—4 |

S. CLEMENT SWISHER, *Acting Primary Examiner.*

W. A. HENRY II, *Assistant Examiner.*